Jan. 31, 1933.  J. C. McCUNE  1,895,472
RELEASE VALVE
Filed Feb. 19, 1929

INVENTOR
JOSEPH C. McCUNE
BY *Wm. M. Cady*
ATTORNEY

Patented Jan. 31, 1933

1,895,472

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

RELEASE VALVE

Application filed February 19, 1929. Serial No. 341,168.

This invention relates to release valve devices, and more particularly to a release valve device for releasing fluid under pressure from the auxiliary reservoir of a fluid pressure brake system.

An object of the invention is to provide a release valve device in which the valve mechanism may be operated so as to vary the rate of flow of the fluid.

Another object of the invention is to provide a release valve device in which the amount of lift transmitted to the valve by the valve actuating mechanism may be accurately controlled.

Another object of the invention is to provide a release valve device in which the levers of the valve actuating mechanism are mounted on fixed fulcrums.

Another object of the invention is to provide a release valve device in which the valve is carried by a stem which is guided at both ends.

Another object of the invention is to provide a release valve device in which the parts may be disassembled without removing the device from the vehicle.

Another object of the invention is to provide a release valve device in which the valve is fitted with an improved type of replaceable seat.

Another object of the invention is to provide a release valve device in which means are included for maintaining the valve spring in proper alinement.

Another object of the invention is to provide a release valve device in which the inlet opening is located in the side wall of the valve body.

Another object of the invention is to provide a release valve device of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

Figure 1:
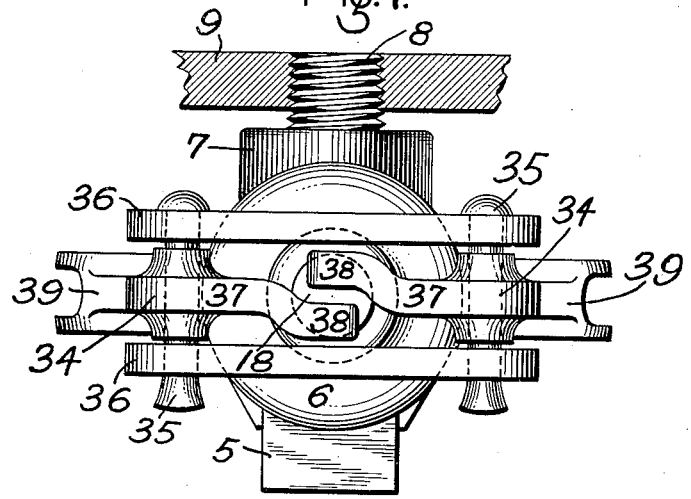

In the accompanying drawing; Figure 1 is an elevation of a release valve device embodying the invention; and Fig. 2 is a section through the valve body.

Referring to the drawing, the release valve device may comprise a casing 6, the side wall of which on one side is formed with a boss 7 having a threaded nipple 8 projecting therefrom. The nipple 8 is adapted to be screwed into an auxiliary reservoir 9 of a fluid brake system. The wall of the casing 6 opposite to the boss 7 is formed with a rectangular lug 5 to receive a wrench or other tool for screwing the device into place on the reservoir.

The casing 6 is formed with an internal cavity containing a release valve 10 adapted to engage a seat rib 11 formed on the wall of the cavity between juxtaposed chambers 12 and 13. The cavity extends longitudinally through the casing and the opposite end walls of the chambers 12 and 13 are open.

Figure 2:
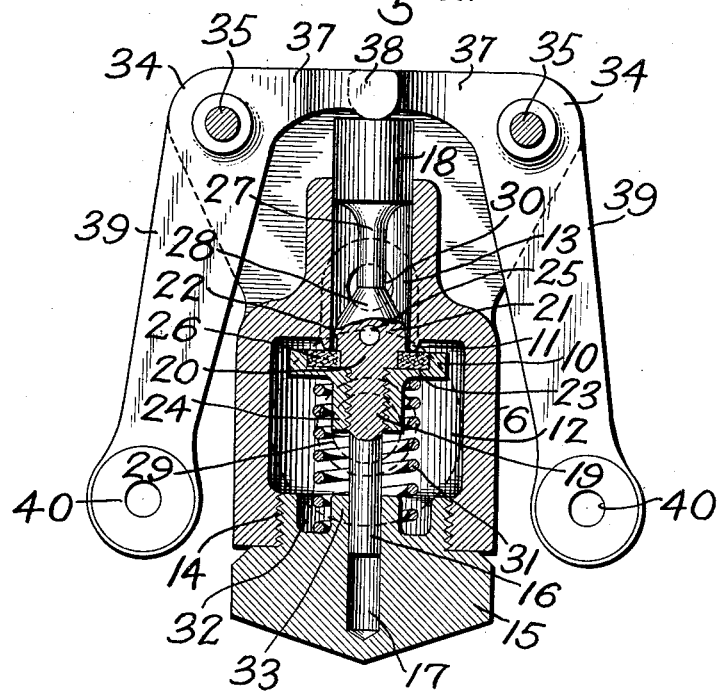

The open end wall of the chamber 12 is screw-threaded, as indicated at 14, Fig. 2, for receiving a threaded plug 15 which is adapted to close the open end wall of the chamber. The opening in the end wall of the chamber 12 should be of such size as to permit the insertion and withdrawal of the valve 10 when the plug 15 is removed.

The valve 10 is carried by a rod or stem 16 that extends lengthwise of the chambers 12 and 13, said stem being guided at both ends. One end of the valve stem is mounted in a bore 17 formed in the plug 15, while the opposite end of the stem is enlarged at 18 to snugly fit the wall of the open end of the chamber 13. When the valve 10 is seated, the portion 18 of the stem 16 projects a suitable distance beyond the casing 6. As shown in Fig. 2, the length of the valve stem 16 and the depth of the bore 17 are such that when the valve is unseated its maximum amount, the bottom of the bore 17 acts as a stop for preventing further movement of the valve away from its seat.

The valve 10 is detachably or removably mounted on the stem 16, and for this purpose the intermediate portion of the stem 16 is formed with a threaded section 19 having a diameter slightly greater than the diameter of the adjacent portion of the valve stem.

Beyond the threaded section 19, the diameter of the valve stem is further increased, as indicated at 20, and beyond the portion 20, the valve stem is further enlarged, as indicated at 21. Between the portions 20 and 21, there is a step or shoulder 22.

The valve 10 is preferably made in the form of a disc, one face of which is formed with an annular recess 23, while the opposite face is provided with an internally threaded tubular boss 24 adapted to engage the threaded portion 19 of the valve stem 16.

The stem 16 is provided with an opening 25 through which a pin or other suitable instrument (not shown) is adapted to be passed for the purpose of holding the valve stem from rotating when the valve 10 is being screwed on to or unscrewed from the stem.

Mounted in a recess 23 is an annular perforated disk of suitable material, constituting a valve seat 26.

The construction and arrangement of the parts of the valve means is such that when the valve 10 is screwed tightly on the stem 16, the seat 26 will be clamped between the inner face of the recess 23 and the shoulder 22.

Should it be necessary to renew the valve seat 26, the valve body 10 can be unscrewed from the stem 16, and a new perforated disk inserted in the recess 23, it being understood that the valve can be quickly removed from the casing by unscrewing the plug 15 and withdrawing the valve. If so desired, this can be accomplished while the casing 6 is mounted on the reservoir 9.

Intermediate the portions 18 and 21, the stem 16 is reduced in diameter, as indicated at 27, while the portion between the reduced portion 27 and the enlarged portion 21 is tapered, as indicated at 28.

The enlarged portion 21 of the stem 16 has a diameter slightly less than the diameter of the chamber 13. Therefore, this portion of the stem 16 will restrict, to some extent, the flow of fluid from the chamber 12 to the chamber 13 when the valve 10 is moved a slight distance away from the seat rib 11, because the mouth of the chamber 13 will be choked by the enlarged portion 21 until the valve has moved a predetermined distance away from the seat rib 11.

Inasmuch as the tapered portion 28 of the valve stem 16 adjoins the end of the enlarged portion 21 opposite the end of the enlarged portion which is disposed in the mouth of the chamber 13, when the valve 10 is being moved away from the seat rib 11, the flow area will be gradually increased in proportion to the movement of the valve, so that when the valve is unseated its maximum amount, unrestricted flow of the fluid is permitted. Thus it will be seen that the portions 21 and 28 provide means for restricting the flow of fluid in varying amounts when the valve 10 is moved away from or toward the seat rib 11. Hence, when it is desired to release fluid from the reservoir 9 at a slow rate, the valve should be unseated only a slight amount, but if it is desired to quickly empty the reservoir, the valve can be unseated a distance sufficient to permit an unrestricted flow of the fluid from the chamber 12 to the chamber 13.

The boss 8 is internally bored, as indicated at 29, to provide an inlet passage to the chamber 12, while the side wall of the chamber 13 is provided with an opening 30, constituting an outlet passage. The openings 29 and 30, it will be noticed, are disposed in the side wall of the casing 6 and enter the valve cavity of the device at right angles to the longitudinal center line of the valve stem 16. This construction reduces to a minimum the amount of obstruction within the cavity through which the fluid passes when the fluid is being released from the auxiliary reservoir 9.

The valve 10 is maintained seated against the seat rib 11 by means of a single expansible coil spring 31. The spring encircles the stem 16, and one end of the spring bears against the face of the valve body opposite to the face in which the valve seat 26 is mounted. The opposite end of the spring 31 is disposed in an annular recess 32 formed in the plug 15. The inner periphery of the recess 32 is greater in diameter than the diameter of the bore 17, so that the recess is separated from the bore by a wall 33. The construction is such that the spring 31 will be maintained in proper alinement by the boss 24, at one end, and by the recess 32, at the other end, it being understood that the recess 32 has a sufficient depth to receive one or two coils of the spring.

For operating the valve stem 16, operating levers 34 are provided. Each lever is pivotally mounted on a pin 35 carried by lugs 36 of the casing 6.

The levers 34 may be in the form of bell cranks. One arm 37 of each lever terminates in a laterally offset portion 38 which overlies the end 18 of the valve stem 16, while the other arm 39 of each lever is provided with an eye 40, to which the usual operating rods (not shown) are adapted to be connected. It will be noted that the levers are similarly formed, thus reducing the cost of manufacturing the device.

In operation, upon movement of either of the levers 34, the valve stem 16 will be depressed, thereby unseating the valve 10. If it is desired to release fluid from the auxiliary reservoir 9 at a slow rate, the lever 34 is operated to unseat the valve 10 only a slight amount, and the fluid flowing from chamber 12 into chamber 13 will be restricted by the enlarged portion 21 which is disposed in the mouth of the bore of the cylinder 13.

Should it be desired to increase the flow of fluid, the lever 34 can be operated to further depress the valve stem 16, so as to carry the enlarged portion 21 of the stem 16 past the mouth of the bore of the cylinder 13.

Inasmuch as the portion 28 of the valve stem is tapered away from the enlarged portion 21, when the valve is moved further away from the seat rib, the restriction is gradually reduced, thereby increasing the flow area so as to increase the rate of flow of fluid from the chamber 12 to the chamber 13.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A release valve device comprising a body having a plurality of chambers formed therein, a seat rib between adjoining chambers, a valve engaging the seat rib and controlling communication between the chambers, a stem supporting the valve, and a conical plug carried by the stem for variably restricting the flow of fluid when the valve is unseated.

2. A release valve device comprising a body having a plurality of chambers, a seat rib between adjoining chambers, a valve engaging the seat rib and controlling communication between the chambers, a stem supporting the valve, and a conical plug carried by the stem for varying the rate at which the fluid flows when the valve is moved toward and away from the seat rib.

3. A release valve device comprising a body having juxtaposed chambers, a seat rib formed between the chambers, a valve for engaging the seat rib to control communication between the chambers, means for unseating the valve to permit the fluid to flow from one chamber to the other, and a conical plug carried by the valve and disposed within one of the chambers for variably restricting the flow of fluid thereinto.

4. A release valve device comprising a body having communicating chambers, a seat rib between the chambers, a stem slidably mounted in the body and extending through the chambers, a valve mounted on the stem for engaging said seat rib to control communication between the chambers, means for unseating the valve to permit fluid to flow from one chamber to the other, and a tapered enlargement on the portion of the valve stem in one of the chambers for variably restricting the flow of fluid when the valve is moved away from and toward the seat rib.

5. In a fluid pressure release valve device, the combination with a casing and a release valve for venting fluid through a cylindrical outlet in the casing bore, of a plug carried by said valve and extending into said bore, said plug having a cylindrical section, providing a constant restricted flow area for a predetermined movement of the valve from its closed position and having a conical section to provide a gradually increasing flow area, as the valve is moved further from its closed position.

6. A release valve device comprising a casing, a valve stem having the section at one end extending into a bore of the casing and having a section at the other end of greater diameter and extending out of a bore in the casing, a lever for operating said stem having a portion engaging the end of the large diameter section of the stem, and a release valve mounted on said stem intermediate the ends of the stem.

In testimony whereof I have hereunto set my hand, this 15th day of February, 1929.

JOSEPH C. McCUNE.